(12) United States Patent
Fink et al.

(10) Patent No.: US 6,499,179 B1
(45) Date of Patent: Dec. 31, 2002

(54) WIPER ARM FOR A WINDOW CLEANING SYSTEM

(75) Inventors: Andreas Fink, Grossbottwar (DE); Michael Grossmann, Grossachsenheim (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/463,173

(22) PCT Filed: Apr. 27, 1999

(86) PCT No.: PCT/EP99/02823

§ 371 (c)(1),
(2), (4) Date: Jan. 18, 2000

(87) PCT Pub. No.: WO00/01564

PCT Pub. Date: Jan. 13, 2000

(30) Foreign Application Priority Data

Jul. 3, 1998 (DE) .......................... 198 29 759

(51) Int. Cl.⁷ .............................. B60S 1/52; B60S 1/32
(52) U.S. Cl. .............................. 15/250.04; 15/250.351; 15/250.201
(58) Field of Search ............... 15/250.351, 250.352, 15/250.201, 250.361, 250.04, 250.33, 250.32, 250.21, 250.23

(56) References Cited

U.S. PATENT DOCUMENTS

| 3,263,261 A | * | 8/1966 | Schulz ............... 15/250.352 |
| 4,984,325 A | * | 1/1991 | Arai ................... 15/250.201 |

FOREIGN PATENT DOCUMENTS

| CH | 628 297 | | 2/1982 | |
| DE | 2736606 | * | 2/1979 | ........... 15/250.201 |
| DE | 33 29 382 | | 2/1985 | |
| DE | 34 24 729 | | 2/1986 | |
| DE | 196 03 830 | | 8/1997 | |
| DE | 197 02 701 | | 8/1997 | |
| DE | 197 32 521 | | 2/1999 | |
| DE | 197 45 460 | | 4/1999 | |
| EP | 538093 | * | 4/1993 | ........... 15/250.351 |
| EP | 0 791 514 | | 8/1997 | |
| FR | 2652325 | * | 3/1991 | ........... 15/250.351 |
| JP | 3-59263 | * | 6/1991 | ........... 15/250.201 |

* cited by examiner

Primary Examiner—Gary K. Graham
(74) Attorney, Agent, or Firm—J. Gordon Lewis

(57) ABSTRACT

The invention is wiper arm for a device for the cleaning of a windshield on a vehicle with a retaining element attached to a drive shaft to which a wiper arm part is articulated such that it can be tilted onto and away from the windshield and which is pressed down in the direction of the windshield with a force at least during the operation of the windshield washing device, and with the free end of which a wiper can be connected and with a separate trim that is attached to the wiper arm and extends in a longitudinal direction over the greater part of the length of the entire wiper arm part, and over all of the length of the wiper that is connected to the wiper arm. In order to guarantee a simple and problem-free handling for tilting the wiper arm part up away from the windshield or for exchanging wipers, the trim is connected to the wiper arm part in the area of an end that faces the retaining element such that the trim can be swiveled relative to the wiper arm part about an axis that runs perpendicular to the wiper arm.

28 Claims, 3 Drawing Sheets

WIPER ARM FOR A WINDOW CLEANING SYSTEM

BACKGROUND OF THE INVENTION

1. Field of the Invention

The invention concerns a wiper arm for a device for the cleaning of a windshield on a vehicle.

2. Description of the Art

It is already known that wipers that link to a wiper arm are equipped with a variety of attachments or spoiler elements. It is also known that the wiper arms are equipped with a variety of attachments and spoiler elements. From EP 0 538 093 Al a wiper arm is known which has a conventional structure, i.e., a wiper arm component that consists of a linking element made out of sheet metal and of a wiper bar attached to it that is linked to a retaining element allowing it to pivot. A conventional wiper is snap-linked on to the hooked end of the wiper arm by means of a connecting piece. The wiper is formed by a bow-shaped wiper blade retainer and an elastic wiper blade retained by it. A one-piece trim that is clipped onto the top of the wiper arm and held in place by a snap-lock connection has a U-like cross-sectional shape that is open toward the windshield. This rigid trim extends over the full length of the entire wiper arm and the wiper blade that is connected to it. Except for the side that faces the windshield, the wiper arm is completely wrapped into the trim. In the area of the wiper blade, the longitudinal edges of the trim that face each other extend downward over a large part of the height of the bow construction of the wiper blade retainer, whereas lower edges end at a distance above the upper edge of the wiper blade. Between the upper side of the wiper blade and the lower edges of the trim, a clearance of several millimeters height remains. A disadvantage of this type of wiper arm is that the trim prevents the tilting up of the wiper arm from the windshield that may become necessary from time to time, and also this design is a strong impediment to exchanging the wiper that is connected to the wiper arm. The consequence of this design is that the wiper arm trim must be removed before tilting the wiper up from the windshield and exchanging the wiper, and that the trim must be re-installed after the wiper exchange or after tilting the wiper back down on the windshield. The snap-on fastening parts of the trim are difficult to access, and the trim is therefore difficult to remove. There is also the risk that the snap-on fastening elements might break off from the trim rendering the entire trim useless. Because the lower edges of the trim end in the area of the wiper at a distance above the upper side of the wiper blade, an opening is formed through which the wind blast pushes, and across which the lower parts of the bow construction of the wiper blade retainer extend. This opening has negative effects on the aerodynamics and aero-acoustic characteristics at high speeds.

It is the purpose of the invention to improve a wiper arm of the type described above such that the wiper arm can be easily tilted upward or the wiper can be easily exchanged.

SUMMARY OF THE INVENTION

According to the invention, the task is solved, by a wiper arm wherein the desired simple handling is guaranteed because the trim that is manufactured as a separate part is attached, with its end that faces an adapter piece, to the wiper arm part in a manner that permits it to pivot around an axis that extends perpendicularly to the wiper arm part, relative to the wiper arm part or relative to the wiper arm.

Due to this configuration, the wiper arm part that is linked to the retaining element to the free end of which the wiper is linked can be tilted up and away from the windshield in the same simple manner as is known from conventional wiper arms, e.g., if the windshield needs to be cleaned manually. For the execution of a wiper exchange, the trim can also remain connected to the wiper arm—it just needs to be tilted in an upward direction from its closed position around the axis that extends perpendicularly to the wiper arm part into an open position. This exposes the linkage area of the wiper to the wiper arm, and the wiper exchange can be made in the usual easy fashion. After the exchange of the wiper has been completed, the trim is tilted back into its closed position. The tilting of the trim from the closed into the open position can be conducted in any of the positions the wiper arm part might assume in relation to the retaining element of the wiper arm.

An advantageous configuration of the invention, with the trim is connected to the wiper arm via two trunnions that engage in bearing bores or recesses, makes a simple and cost-efficient production of a wiper arm that is equipped with the trim possible according to the invention. The trunnions can be located on the trim and protrude inward from two side walls of the trim that face each other. In this case, corresponding bearing bores or bearing recesses are located on the opposite longitudinal sides of the wiper arm part into which the trunnions engage. If necessary, the bearing bores or bearing recesses can also be located on the walls of the trim that are facing each other. The trunnions are located on the wiper arm part in this case, and extend in an outward direction from its opposite outsides. If the dimensions are sized accordingly in consideration of the elasticity of the trim, this linked connection can be configured as a friendly snap-on connection.

One configuration of the invention provides that the trim can be locked into its closed position, and possibly, also into its open position on the wiper arm part, by means of a reversible locking device. Locking the trim in its closed position guarantees safe operation of the windshield cleaning device; while locking it in its open position facilitates easy handling when changing wipers. The locking device can be configured in a simple manner by one or several snap ons in combination with one or several snap grooves that are located alternatingly on the trim and on the wiper arm part near the pivoting axis that is located between the wiper arm part and the trim, and that interact with each other making use of the elasticity of the trim. In the simplest form, a snap on can be configured at an appropriate distance from the pivoting axis on the inside of the side wall of the trim that, in the closed position, snaps in behind the lower edge, and in the open position behind the upper edge of the wiper arm part.

Another advantageous configuration of the invention provides that a springy snap element that is attached to the trim or molded into it and that can be swiveled, interacts with the wiper arm part as a locking element, preferably with the free end of the wiper arm part. This locking element can be configured in such a manner that the locking or the unlocking of the trim in relation to the wiper arm part is effected as a result of tilting the trim into the open position or the other way around. For ease of handling, this would be particularly advantageous. However, if, by comparison, inadvertent unlocking, in particular caused by the force of the wind blast at high driving speeds, is to be positively precluded, the locking element needs to be configured with an accordingly strong undercut, or the locking element must be configured to require appropriately high disengagement forces for it to unlock. In this case the greater advantage of operational safety requires a manual operation of the locking element as an additional operational measure that, in view of the achievable advantage, must be accepted as appropriate.

A configuration is preferred that provides the trim as a spoiler, preferably as an integral spoiler. With such a spoiler or integral spoiler, shapes can be realized that can decisively influence the high speed behavior of a wiper arm equipped with a wiper with regard to aerodynamics and aero-acoustics. According to the invention, there is no need for spoilers on the wiper itself so that in connecting to the wiper arm, low cost wipers without spoilers can be used. The trim, in particular the trim shaped as integral spoiler, can also be understood as an additional design detail that makes it possible to adapt the essentially conventional wiper harmonically to differing vehicle concepts. Exposed edges are covered by the integral spoiler.

In this context, an advantageous configuration of the invention is recommended in which the integral spoiler over most of the length of the wiper arm part and over all of the length of the wiper covers the upper side of the wiper arm part and the wiper completely, and, starting with its top side, extends toward the windshield of the vehicle at the longitudinal side that is exposed to the wind blast. This configuration makes certain that edges located in sequential order on the wiper arm and the wiper that could produce wind noises when driving are covered.

In an advantageous configuration, the noise production that is caused by the wind blast blowing into open edges of the wiper arm and the wiper can be further reduced if, in the operating position of the wiper arm that is connected to a wiper, the lower edge of the trim, or of the integral spoiler at its longitudinal side that is exposed to the wind blast, extends close to the windshield of the vehicle without touching it. In this configuration, essentially all edges of the wiper arms and the wiper that are exposed to the wind blast are completely covered.

In order to prevent damage to the windshield or its surface in the event that a wiper inadvertently hits the windshield or, in the event that the lower edge of the trim or the integral spoiler makes inadvertent contact with the windshield, an advantageous configuration provides that the lower edge of the trim, or the integral spoiler is made from a soft and, in particular a rubber-like material, or is formed by a lip out of such softer, in particular, a rubber-like material that is attached to the trim or the integral spoiler.

In order to achieve economic and targeted application of washing fluid to the windshield to be cleaned, it is already known to attach to the wiper or to the wiper arm a spraying tube with lateral jet openings that are distributed along the length of the wiper. The cleaning fluid is transported to the spraying tube via a hose that can be connected to the spraying tube. If the spraying tube is located on the wiper, the hose connection must be disconnected and reconnected for every wiper exchange. If the spraying tube is located on the wiper arm, it protrudes over the free end of the wiper arm in a longitudinal direction which is counterproductive in regard to aerodynamics, aero-acoustics, and styling. Therefore, a preferred configuration of the invention is particularly advantageous in that it provides that a jet device for the application of the washing fluid on the windshield to be cleaned is configured and retained on the trim, or on the integral spoiler. When changing the wiper, the jet device is simply tilted into the open and then again into the closed position together with the trim, or the integral spoiler. No further handling is needed.

Advantageous in this context is a configuration of the invention in which the jet device covered from the oncoming wind blast is located under or behind the trim, or the integrated spoiler, preferably on the rearward part of the trim or the integral spoiler that is facing away from the oncoming wind blast. In this manner, the jet device cannot negatively influence the aerodynamic or aero-acoustic behavior of the wiper arm. By the same token, a negative impact on the styling because of the jet device can also be excluded. In addition, it is guaranteed that the fluid would be applied from the jet device problem-free, and aimed onto the windshield in the direction of motion of the wiper that started moving from its housed position.

Advantageous for an effective application of the washer fluid on the windshield in this context is a configuration that provides that the jet device contains a fluid channel that can be connected to a hose and extends along the trim or along the integral spoiler up to the end of the wiper that faces away from the retaining element, or at least into the vicinity of this end, and is connected to several spraying jets that are distributed along the length of the wiper. If, in addition, the jet device is configured as a separate, oblong, rigid or flexible hollow-profile body with lateral spraying jets, that is, preferably snap-locked, retained by a retaining device of the trim, or the integral spoiler, the possibility results that a clogged jet may be exchanged for a new one. In the event that the jet device is configured to form one piece with the trim, or with the integrated spoiler, the complete trim or the complete integrated spoiler would have to be exchanged. A flexible configuration of the hollow-body profile that constitutes the jet device would have the additional advantage that identical jet devices could be used for the differently shaped integral spoilers or trims since the jet device can be flexibly adjusted to follow the contour of the spoiler.

The particular advantage of a configuration in which the trim, or the integral spoiler, made out of plastic material and, in particular, by use of injection molding, is, above all, to be seen in the manifold shaping options that could be realized at a reasonable cost.

BRIEF DESCRIPTION OF THE DRAWING

Based on the drawing below, a configuration sample is more closely described. The following figures of the drawing show.

DESCRIPTION OF THE PREFERRED EMBODIMENT

Figure 1:
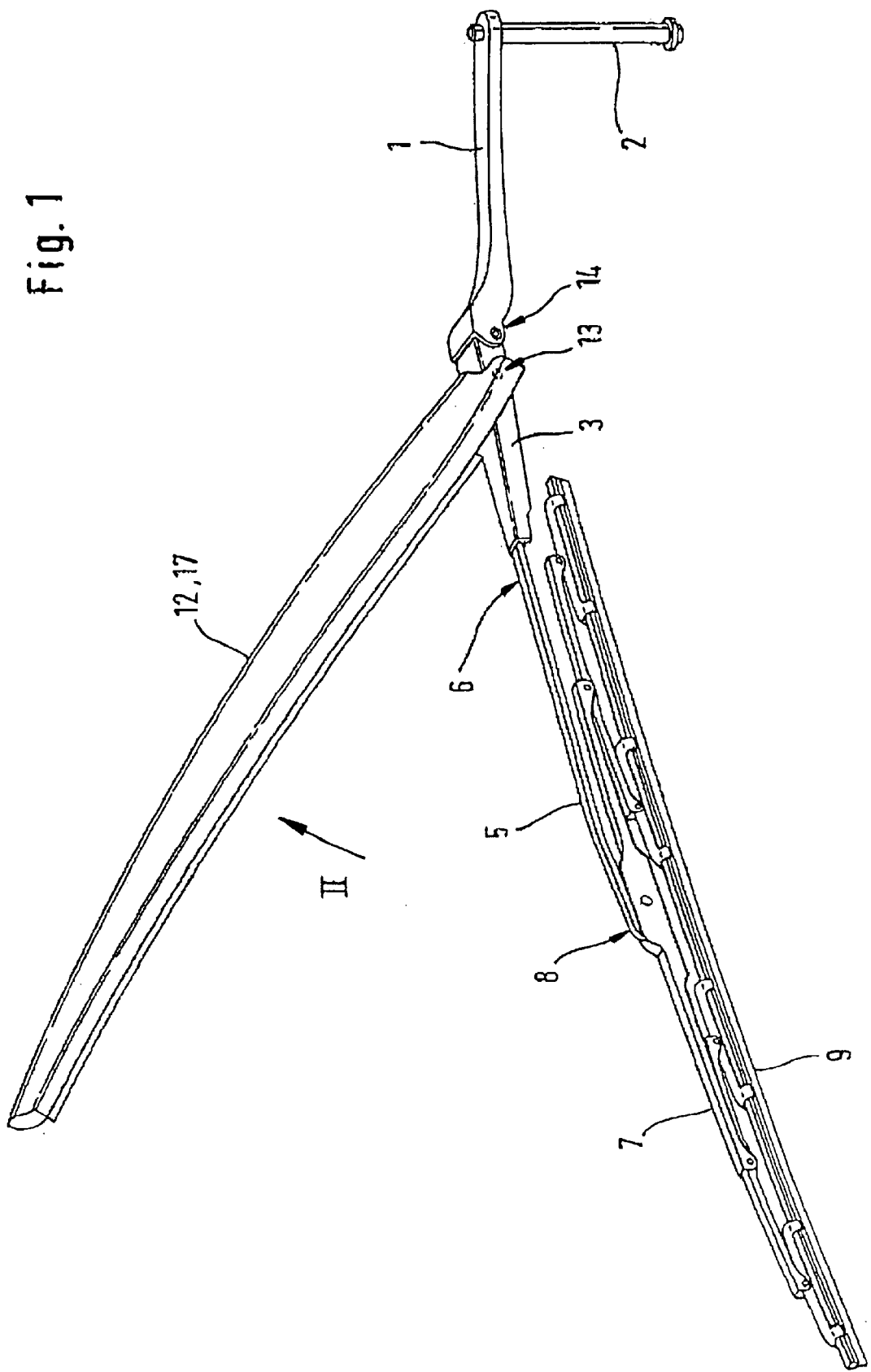
FIG. 1 is a perspective view of a wiper arm equipped with a wiper with trim that is pivoted into an open position.
Figure 2:
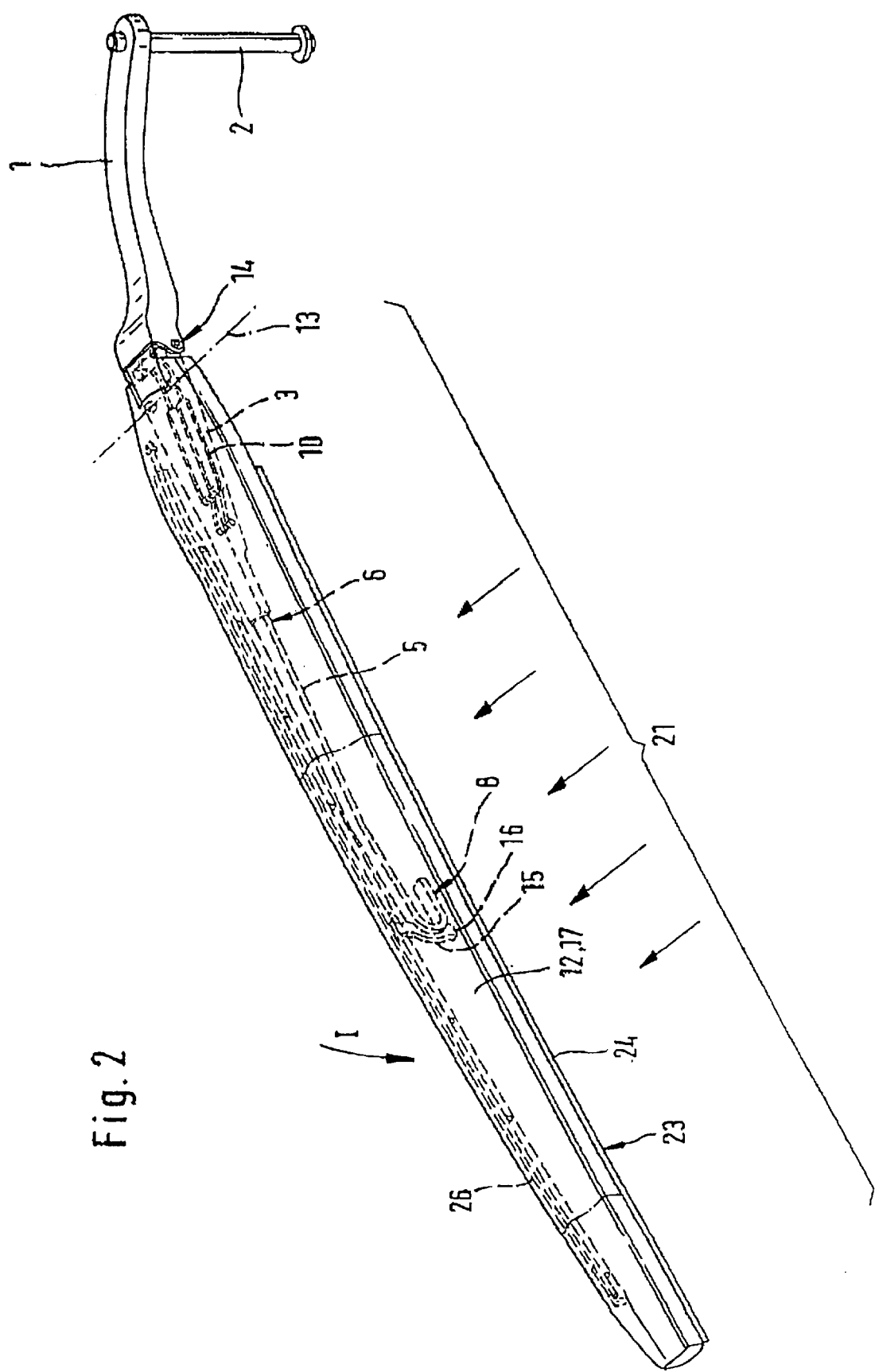
FIG. 2 is a perspective view of a wiper arm, without a wiper, with the trim locked in the closed position.

In FIGS. 1 and 2, a wiper arm of conventional design can be seen. This wiper arm features a retaining element 1 that is manufactured as a stamped sheet metal part or as a die cast part, the end of which can be a slip-proof attachment on a reciprocating driven wiper shaft 2. Wiper shaft 2 has been drawn schematically in FIGS. 1 and 2 only for the purpose of indicating its position. At the other end of the retaining element 1, a linking part 3 that is configured as a stamped sheet metal part is link-connected in such a way that it can be tilted in the direction of the windshield 4 of the vehicle that is to be cleaned (FIG. 3), and away from it again. A wiper bar 5 is attached to the linking part 3 that is made from steel strip, such that the linking part 3 and the wiper bar 5 together form a wiper arm part 6 that is link-connected to the retaining element 1. Wiper arm part 6 could also be manufactured as one part out of sheet metal, with its free end shaped like a hook that is suitable for connecting it with wiper 7. The wiper 7, of conventional design, comprises a wiper structure that is composed of several bows that are articulated together, in the claws of which the upper part of a wiper blade 9 is retained. In FIG. 2, two spring elements 10 can be seen that are connected both to the wiper arm part and to the retaining element 1. The function of these spring elements is to exert spring pressure upon wiper arm part 6 in its operating position, pressing it against the windshield 4, or to maintain the wiper arm part 6 in a stable up-tilted position after it has been tilted off the windshield 4.

Essential for the invention is an oblong trim 12 that is made out of plastic material and held on the wiper arm. The trim 12 is attached in the area of its one end to the linking part 3 of the wiper arm 6, and can be tilted around an axis 13 that runs perpendicular to the wiper arm 6. The pivoting axis 13 is located at a relatively short distance from link 14 that is located between retaining element 1 and linking part 3. This makes it possible for the trim to extend over almost the full length of the wiper arm part 6. The pivoting link that is provided in the area of the pivoting axis 13 is formed by two bearing trunnions that are configured on the trim 12, and which engage in corresponding bores, or recesses, in linking part 3. While in FIG. 1 the trim 12 is shown in an open position II, the trim 12 assumes a closed position I in FIG. 2 in which it is additionally secured to the wiper arm part 6 by means of a snap lock element 15 that can be manually operated. The snap lock element 15 is a snap arm that constitutes one piece with the trim 12 protruding within the trim 12 from the top side downward. The snap lock element 15 has a concave contour that is capable of retaining the free end of the wiper bar in a snap-on manner. In the present case, the snap lock element 15 is snap-engaged with the bow-shaped external surface of the hook 8 that is configured at the free end of the wiper bar 5. For the manual operation of snap lock element 15, an engagement cam 16 is configured on the snap lock element 15. By moving the elastic snap lock element 15 in the direction of the free end of the trim 12, the snap connection between wiper arm 6 and the trim 12 is released, and the trim 12 can be tilted into the open position II.

At this juncture it should be pointed out that the wiper arm part 6, and together with it, the trim 12 can, if required, be tilted into a position away from the windshield 4 of the vehicle, whereas the trim 12 can remain in the closed position I in relation to the wiper arm part 6. It is also possible to move the trim 12 into its open position II independently from the position of the wiper arm part 6.

Figure 3:
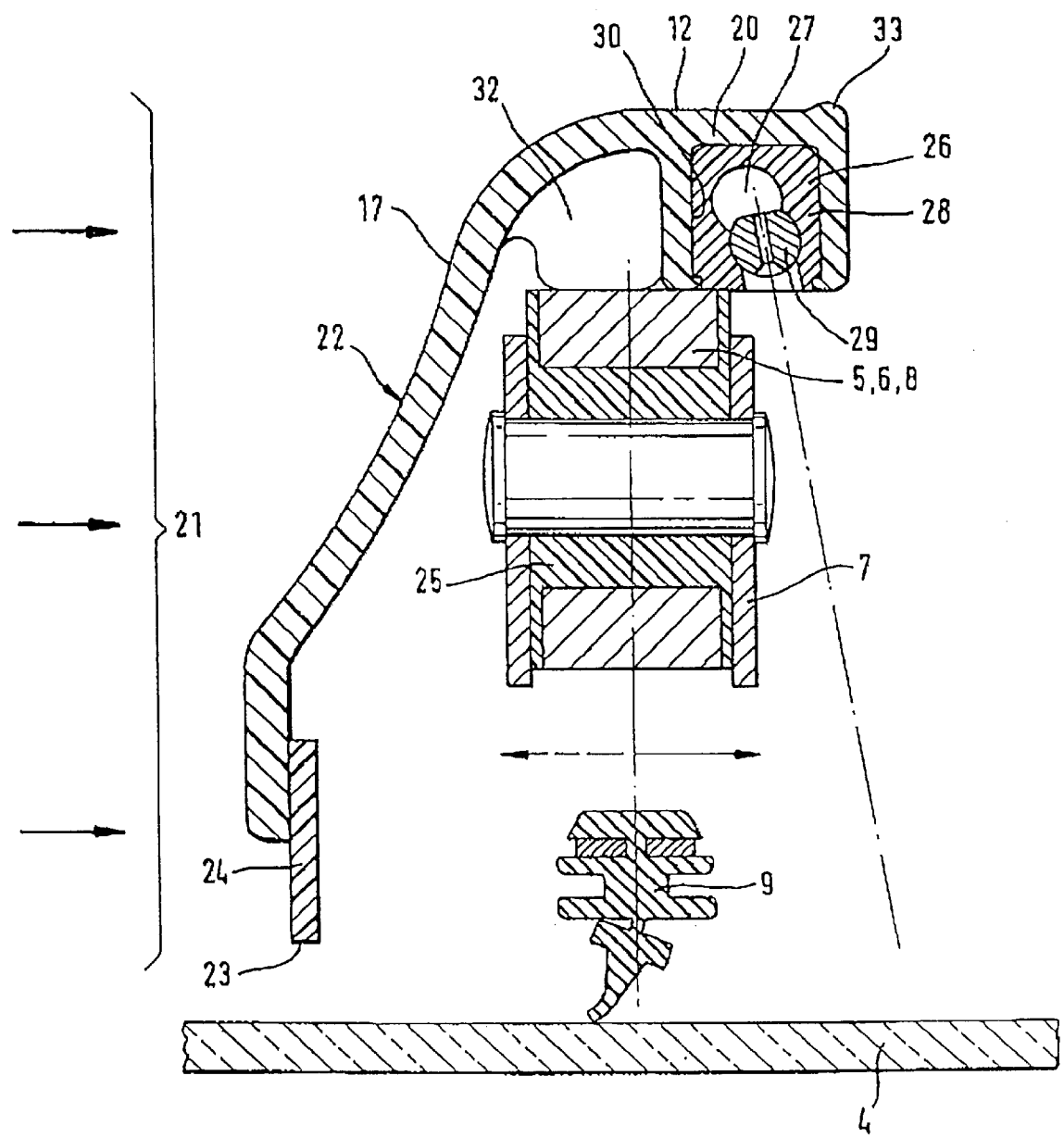
FIG. 3 is a vertical cross-sectional view through a wiper arm in an operating position with the wiper linked to the wiper arm in the area of the link axis formed between the wiper arm and the wiper.

It is another essential characteristic of the invention that the trim 12 is configured as a spoiler, preferably as an integral spoiler. This characteristic can best be seen in the cross sectional view shown in FIG. 3. The trim 12, or the integral spoiler 17, is shaped in such a way that its upper part 20, in relation to the oncoming wind blast 21, extends behind the wiper 7, or the wiper arm part 6. Beginning with the upper part 20, the trim 12 or the integral spoiler 17 extends opposing the oncoming wind blast 21 in the direction of the windshield 4 of the vehicle. The external surface 22 of the integral spoiler 17 is configured as an air channeling surface and features air-drag optimized transitions. The lower edge 23 of the trim 12 or of the integral spoiler 17 that faces the windshield 4 extends close to the windshield when the wiper arm is in its operating position, but will not touch it. In order to avoid damage to the windshields 4, this lower edge 23, as compared to the plastic material used for the remainder of the trim or of the integral spoiler, is made of soft and, particularly, rubber-like material. The lower edge 23 can be part of a lip 24 that is manufactured separately and subsequently attached to the trim 12, or to the integral spoiler 17, or has been directly molded to the trim 12, or to the integral spoiler 17. In FIG. 3, it can be seen that, in relation to the vertical direction, the lower edge 23 extends so closely down to the windshield 4 that, in relation to the oncoming wind blast 21 that flows parallel to the windshield 4, a large part of the height of the wiper blade 9 is covered.

Such a trim 12, or such an integral spoiler 17, that extends, as can be seen in FIGS. 1 and 2, along the largest part of the length of the wiper arm part 6, and along the entire length of the wiper 7, and that in doing so completely covers the upper side of the wiper arm part 6 and of the wiper 7 extending toward the windshield 4 beginning with its upper side and along the longitudinal side that is exposed to the wind blast 21, is optimally suited to improve the aerodynamics of the wiper arm, and to significantly reduce the development of wind noises. The bead-shaped rounded elevation 33 that extends along the rear edge of the upper part 20 of the trim 12 or of the integral spoiler 17 counteracts the formation of strong air turbulences, thus further improving the aerodynamics and reducing the development of wind noises.

In FIG. 3 it can be seen that wiper 7 has a tilt connection in a basically known fashion via a connecting piece 25 with hook 8 of the wiper bar 5.

As an essential characteristic, it should be noted that the wiper arm is equipped with a jet device 26 for the application of washer fluid on the windshield 4 of the vehicle. This jet device 26 as shown in FIGS. 2 and 3 is attached to the trim 12 or to the integral spoiler 17. This feature has the particular advantage that during a necessary wiper exchange, the washer fluid supply can remain connected to the jet device 26, because the jet device 26 can be moved into the open position II together with the trim 12 or together with the integral spoiler 17. In comparison with a configuration variant in which the jet device is attached to the wiper, the necessary wiper exchange is also less expensive since conventional wipers without jet devices are less expensive, and since this jet device can continue to be used because of its attachment to the trim 12, or to the integral spoiler 17. Since the jet device 26 is located behind the trim 12 or the integral spoiler 17, in relation to the oncoming wind blast 21, preferably on the rearward area of the trim 12 or of the integral spoiler 17 that faces away from the oncoming wind blast 21, this jet device 26 will not have any negative influence on the aerodynamics or the development of wind noises.

The jet device 26 consists of a fluid channel 27 that is either directly molded into the trim 12 or the integral spoiler 17, or is configured as a separate oblong hollow-profile body 28 that features lateral spraying jets 29. The spraying jets 29 that are positioned along the length of the hollow-profile body 28 can preferably be configured as spatially pivotable jet balls.

From FIG. 3 it can be seen that the jet device 26, or the hollow-profile body 28 that pertains to the jet device 26, is snap-retained in retaining element 30 that is configured in the shape of a channel underneath the upper part 20. The channel-shaped configuration of the retaining element 30 is advantageous if the hollow-profile body 28 is made out of flexible material allowing it to be adapted to a curved contour of the trim 12 or of the integral spoiler 17. In the event that the hollow profile body is made out of rigid material, it suffices to provide several retaining devices in the sectors along the length of the trim 12 or of the integral spoiler 17 for the snap-locked attachment of the jet device 26 or of the hollow-profile body 28.

The location of the jet device 26 in an area of the trim 12 or of the integral spoiler 17 that is facing away from the oncoming wind blast 21, has the advantage that, if the windshield wiper is moved out of the housed position, washer fluid can be sprayed on the windshield 4 of the vehicle through the spraying jets 29 in the direction of the movement in front of the wiper blade 9. This guarantees efficient and sparing use of wiper fluid. In addition, with this configuration of the jet device 26, the wind blast cannot swirl around or disperse the sprayed fluid stream, which facilitates an exact and speed-independent adjustment of the spray stream.

In the cross-sectional view of FIG. 3, a support rib 32 can be seen in the upper area of the trim 12, or of the integral spoiler 17, by means of which the trim 12 or the integral spoiler 17 is supported on the upper side of the wiper arm 6 or the wiper bar 5. It is advantageous to provide several such support ribs 32 along the length of the wiper arm part 6. This facilitates a low-play, rattle-free attachment of the trim 12 or the integral spoiler 17 to the wiper arm part 6.

What is claimed is:

1. A wiper arm for cleaning a windshield on a vehicle having a retaining element attachable to a drive shaft and an elongate wiper arm part articulated to said retaining element be tilted toward and away from the windshield and, at least during cleaning, is pushed against the windshield by a force, a free end of the wiper arm part connected to a wiper and with a separate elongate trim attachable to the wiper arm and extending longitudinally along most of a length of the wiper arm part and over an entire length of the wiper connected to the wiper arm part, characterized in that the trim in an area of an end facing the retaining element has a pivoting connection to the wiper arm part such that the trim can be pivoted relative to the wiper arm part about a pivot axis perpendicular to the wiper arm part.

2. The wiper arm according to claim 1 characterized in that the trim is connected to the wiper arm part by way of two trunnions each engaged in bearing bores.

3. The wiper arm according to claim 1 characterized in that the trim can be locked in at-least a closed position on the wiper arm part by way of a locking device.

4. The wiper arm according to claim 3 characterized in that a springy, tiltable snap-lock element is carried on the trim and interacts with the wiper arm part, as a locking element.

5. The wiper arm according to claim 1 characterized in that the trim is configured as a spoiler.

6. The wiper arm according to claim 5 characterized in that the spoiler completely covers an upper side of the wiper arm part over a greater part of a length of the wiper arm part and over an entire length of the wiper, and extends beginning at an upper part toward the windshield along a longitudinal side exposed to a wind blast.

7. The wiper arm according to claim 1 characterized in that, in an operating position of the wiper arm that is connected to a wiper, a lower edge of the trim extends at a longitudinal side exposed to an oncoming wind blast and close to, but not contacting, the windshield.

8. The wiper arm according to claim 7 characterized in that the lower edge of the trim consists of a soft material.

9. The wiper arm according to claim 7 characterized in that the lower edge of the trim is formed as a lip of a soft material attached to the trim.

10. The wiper arm according to claim 1 characterized in that a jet device is retained on the trim for application of washer fluid to the windshield.

11. The wiper arm according to claim 10 characterized in that the jet device is covered with respect to an oncoming wind blast behind the trim in a rearward area of the trim facing away from the wind blast.

12. The wiper arm according to claim 10 characterized in that the jet device comprises a fluid channel connected to a feeding line, the fluid channel extending along the trim up to an end of the wiper facing away from the retaining element, and connected to a plurality of spraying jets distributed across a length of the wiper.

13. The wiper arm according to claim 10 characterized in that the jet device is a separate body having lateral spraying jets, and is snap-locked into a snap lock retainer on the trim.

14. The wiper arm according to claim 1 it characterized in that the trim is made out of a plastic material.

15. A wiper arm for cleaning a windshield on a vehicle with a retaining element attachable to a drive shaft, a wiper arm part articulated to the retaining element to be tiltable toward and away from the windshield so that, at least during the operation of the windshield cleaning device, the wiper arm part is pushed against the windshield by a force, the free end of the wiper arm part connected to a wiper and with a separate trim attached to the wiper arm extending longitudinally along most of a length of the wiper arm part and over an entire length of the wiper connected to the wiper arm part, the wiper arm comprising:

the trim in an area of an end; facing the retaining element having a pivoting connection to the wiper arm part such that the trim can be pivoted relative to the wiper arm part about a pivot axis perpendicular to the wiper arm part.

16. The wiper arm of claim 15 further comprising the trim connected to the wiper arm part by way of two trunnions, each trunnion engaged in a corresponding bearing bore.

17. The wiper arm of claim 15 further comprising the trim locked in a closed position on the wiper arm part by way of a lock.

18. The wiper arm of claim 17 further comprising a springy, tiltable snap-lock element carried on the trim and interacting with the wiper arm part, as the lock.

19. The wiper arm of claim 15 further comprising the trim configured as a spoiler.

20. The wiper arm of claim 19 further comprising the spoiler completely covering an upper side of the wiper arm part over a greater part of a length of the wiper arm part and over an entire length of the wiper, and extending from an upper part toward the windshield along a longitudinal side exposed to the wind blast.

21. The wiper arm of claim 15 further comprising when the wiper arm is connected to a wiper and is in an operating position, a lower edge of the trim extends along a longitudinal side exposed to an oncoming wind blast and is close to, but not contacting, the windshield.

22. The wiper arm of claim 21 further comprising the lower edge of the trim consists of a soft material.

23. The wiper arm of claim 21 further comprising the lower edge of the trim formed as a lip of a soft material attached to the trim.

24. The wiper arm of claim 15 further comprising a jet retained on the trim for the application of washer fluid to the windshield.

25. The wiper arm of claim 24 further comprising the jet covered with respect to the oncoming wind blast behind the trim in the rearward area of the trim facing away from the wind blast.

26. The wiper arm of claim 24 further comprising the jet including a fluid channel connected to a feeding line, the fluid channel extending along the trim up to an end of the wiper facing away from the retaining element, and connected to a plurality of spraying jets distributed across a length of the wiper.

27. The wiper arm of claim 24 further comprising the jet defined by a separate body having lateral spraying jets, and snap-locked into a snap lock retainer on the trim.

28. The wiper arm of claim 15 further comprising the trim constructed of a plastic material.

* * * * *